US007087269B2

(12) United States Patent
Lee et al.

(10) Patent No.: US 7,087,269 B2
(45) Date of Patent: Aug. 8, 2006

(54) MULTI-COMPONENT COMPOSITE MEMBRANE AND METHOD FOR PREPARING THE SAME

(75) Inventors: Sang-Young Lee, Taejeon (KR); Byeong-In Ahn, Taejeon (KR); Soon-Yong Park, Taejeon (KR); You-Jin Kyung, Seoul (KR); Heon-Sik Song, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 380 days.

(21) Appl. No.: 10/049,212

(22) PCT Filed: Jun. 22, 2001

(86) PCT No.: PCT/KR01/01076

§ 371 (c)(1),
(2), (4) Date: Feb. 5, 2002

(87) PCT Pub. No.: WO01/97957

PCT Pub. Date: Dec. 27, 2001

(65) Prior Publication Data

US 2004/0213985 A1 Oct. 28, 2004

(51) Int. Cl.
- B05D 3/04 (2006.01)
- B05D 3/06 (2006.01)
- B29C 35/10 (2006.01)
- B29C 67/20 (2006.01)
- B29C 55/00 (2006.01)

(52) U.S. Cl. .................. 427/532; 427/533; 427/535; 427/536; 427/314; 427/316; 427/332; 427/331; 427/372.2; 427/377; 427/379; 427/384; 427/385.5; 427/393.5; 427/430.1; 264/413; 264/83; 264/446; 264/447; 264/235; 264/235.6; 264/210.1; 264/210.3; 264/210.7; 264/211.12; 264/211.13; 264/211.18; 264/288.4; 264/289.3

(58) Field of Classification Search ............. 428/304.4, 428/305.5, 306.6, 308.4, 318.4, 319.3, 319.9, 428/319.7, 412, 421, 422, 423.1, 474.4, 480, 428/447, 500, 515, 424.2, 451, 476.3, 483, 428/523; 427/299, 301, 302, 322, 532, 533, 427/551, 331, 371, 384, 385.5; 264/280, 264/288.4, 289.3, 290.2
See application file for complete search history.

(56) References Cited

U.S. PATENT DOCUMENTS

| | | | | |
|---|---|---|---|---|
| 3,249,109 | A | | 5/1966 | Maeth et al. ............... 128/268 |
| 4,234,650 | A | * | 11/1980 | Schieber ..................... 442/110 |
| 4,294,893 | A | * | 10/1981 | Iemmi et al. ................. 429/42 |
| 4,346,142 | A | | 8/1982 | Lazear .................... 428/315.7 |
| 4,388,189 | A | | 6/1983 | Kawaguchi et al. ........ 210/490 |
| 4,438,185 | A | * | 3/1984 | Taskier ...................... 429/250 |
| 4,603,109 | A | * | 7/1986 | Lillo .......................... 435/41 |
| 4,863,604 | A | * | 9/1989 | Lo et al. .................... 210/490 |
| 4,902,424 | A | | 2/1990 | Wrasidlo ............... 210/500.36 |
| 5,085,775 | A | | 2/1992 | Swamikannu .......... 210/500.27 |
| 5,102,552 | A | | 4/1992 | Callahan et al. ............ 210/654 |
| 5,273,657 | A | * | 12/1993 | Nakashima et al. ........ 210/640 |

(Continued)

FOREIGN PATENT DOCUMENTS

CN 1038562 C 6/1998

(Continued)

*Primary Examiner*—Vivian Chen
(74) *Attorney, Agent, or Firm*—Ladas & Parry LLP

(57) ABSTRACT

The present invention relates to a multi-component composite separate membrane and a method for preparing the same, and to a multi-component composite membrane comprising a support layer and active layers, wherein the support layer is located between the active layers.

17 Claims, 2 Drawing Sheets

U.S. PATENT DOCUMENTS

| | | | | |
|---|---|---|---|---|
| 5,294,346 | A | 3/1994 | Donato et al. | 210/645 |
| 5,514,461 | A * | 5/1996 | Meguro et al. | 428/310.5 |
| 5,620,807 | A * | 4/1997 | Mussell et al. | 429/33 |
| 5,677,360 | A * | 10/1997 | Yamamori et al. | 521/134 |
| 5,716,421 | A | 2/1998 | Pendalwar et al. | 29/623.2 |
| 5,753,014 | A * | 5/1998 | Van Rijn | 96/12 |
| 5,783,079 | A | 7/1998 | Kumano et al. | 210/500.23 |
| 5,955,215 | A | 9/1999 | Kurzweil et al. | 429/41 |
| 6,322,923 | B1 * | 11/2001 | Spotnitz et al. | 429/144 |
| 6,491,880 | B1 * | 12/2002 | Wang et al. | 422/211 |
| 6,503,655 | B1 * | 1/2003 | Petricevic et al. | 429/42 |
| 6,540,953 | B1 * | 4/2003 | Lee et al. | 264/413 |
| 6,558,634 | B1 * | 5/2003 | Wang et al. | 422/173 |
| 6,579,342 | B1 * | 6/2003 | Wang et al. | 95/46 |
| 6,710,098 | B1 * | 3/2004 | Lee et al. | 522/161 |
| 6,830,849 | B1 * | 12/2004 | Lee et al. | 429/249 |
| 2003/0031924 | A1 * | 2/2003 | Lee et al. | 429/142 |

FOREIGN PATENT DOCUMENTS

| | | | |
|---|---|---|---|
| EP | 0 933 824 A2 | | 8/1999 |
| FR | 2 723 856 | | 3/1996 |
| JP | 54-102292 A | | 11/1979 |
| JP | 03-065229 | | 3/1991 |
| JP | 08-281085 | | 10/1996 |
| JP | 10-151330 | | 6/1998 |
| JP | 11-049882 | | 2/1999 |
| JP | 11-297297 | | 10/1999 |
| WO | 99/25464 | | 5/1999 |
| WO | WO 99/25464 | * | 5/1999 |
| WO | 00/32294 | | 6/2000 |

* cited by examiner

US 7,087,269 B2

MULTI-COMPONENT COMPOSITE MEMBRANE AND METHOD FOR PREPARING THE SAME

CROSS REFERENCE TO RELATED APPLICATION

This application is based on application No. 2000-34948 filed in the Korean Industrial Property Office on Jun. 23, 2000, the content of which is incorporated hereinto by reference.

BACKGROUND OF THE INVENTION (a) Field of the Invention

The present invention relates to a multi-component composite membrane and a method for preparing the same, and more particularly to a multi-component composite membrane comprising a support layer and an active layer having a structure as dense as the conventional active layers, which is capable of having pores formed thereon according to process conditions and with improved permeability due to the pores of a controllable size, the composite membrane having characteristics of an active layer, and with an interfacial adhesion strength between the support layer and the active layer strengthened by ion beams irradiation, and a method of preparing the same.

(b) Description of the Related Art

Many types of membranes are currently in use, such as microfiltration membranes, ultrafiltration membranes, gas separation membranes, pervaporation membranes, and reverse osmosis membranes.

The present invention relates to a microfiltration membrane, and in particular to a separator comprising polyolefins such as polyethylene and polypropylene, for a rechargeable lithium ion battery.

As one of the polyolefins, when high crystalline polypropylene (HCPP) is used for a separator of the present invention, it is expected that the permeability of the separator will increase. The crystallinity of common polypropylenes is less than 50%, but the crystallinity of HCPP is greater than 50% and it is highly isotactic, so that density, melting point, heat of fusion, and crystallization temperature are high, and characteristics such as rigidity, heat-resistance, impact strength, scratch-resistance, and dimensional stability are excellent.

A composite membrane is generally prepared by interfacial polymerization, modification of membranes, and dip coating. Dip coating is widely used in order to prepare the composite membrane, by using a microporous membrane such as a microfiltration membrane or an ultrafiltration membrane as a support layer, coating the microporous membrane with a solution of a material used as an active layer, and drying the coated membrane. The composite membrane prepared by dip coating has a support layer comprising regularly-sized pores, and an active layer having a dense structure with few pores. The composite membrane is limited in application, since the active layer has few pores of a size similar to those of the microfiltration or ultrafiltration membranes, and it is easily delaminated due to a weak interfacial adhesion strength between the support layer and the active layer.

The composite membrane may be prepared by coating a polymer on the microporous membrane as disclosed in U.S. Pat. Nos. 3,249,109, 4,388,189, and 5,102,552. In addition, a hydrophilic monomer, such as an acrylic acid, and polymers such as polyethylene oxide are grafted with corona treatment so that the membrane has a modified surface, and in particular so that it has hydrophilicity as disclosed in U.S. Pat. Nos. 4,346,142, 5,085,775, and 5,294,346. However, though the membrane has a modified surface and hydrophilicity, the method of graft polymerization is not applied, since the process is complicated and permeability of the membrane is not satisfactory.

A separator having regularly-sized pores for a common battery is coated with a polymer electrolyte solution, and it is used as a separator for a rechargeable lithium ion battery as disclosed in U.S. Pat. No. 5,716,421 and European Patent No. 0933824A2. However, when the separator is prepared by the aforementioned method, the membrane has a dense structure, that is, no pores are formed on the-surface of the membrane, and permeability (e.g. air permeability) deteriorates, and the interfacial adhesion strength between the support layer and the active layer is inadequate.

SUMMARY OF THE INVENTION

It is an object of the present invention to provide a multi-component composite membrane comprising a support layer and an active layer having a structure as dense as the conventional active layers, which is capable of having pores formed thereon according to process conditions and with improved permeability due to the pores of a controllable size, the composite membrane having characteristics of an active layer, and with an interfacial adhesion strength between the support layer and the active layer strengthened by ion beams irradiation, and a method of preparing the same.

In order to accomplish the object, the present invention provides a multi-component composite membrane comprising a support layer and two active layers.

Furthermore, the present invention provides a preparation method of a multi-component composite membrane comprising the steps of:

a) preparing a precursor film by injection of a polymer, which is used for a support layer, into an extruder;
b) annealing the precursor film at a temperature less than a melting point of the polymer;
c) irradiating ion beams on either or both surfaces of the annealed precursor film with the help of an reactive gas;
d) coating both surfaces of the irradiated precursor film with a polymer solution, which is used for an active layer;
e) drying the coated precursor film;
f) low temperature-stretching the dried precursor film at a temperature less than a room temperature;
g) high temperature-stretching the low temperature-stretched precursor film at a temperature less than a melting point of the polymer; and
h) heat setting the high temperature-stretched precursor film with a tension at a temperature less than the melting point of the polymer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
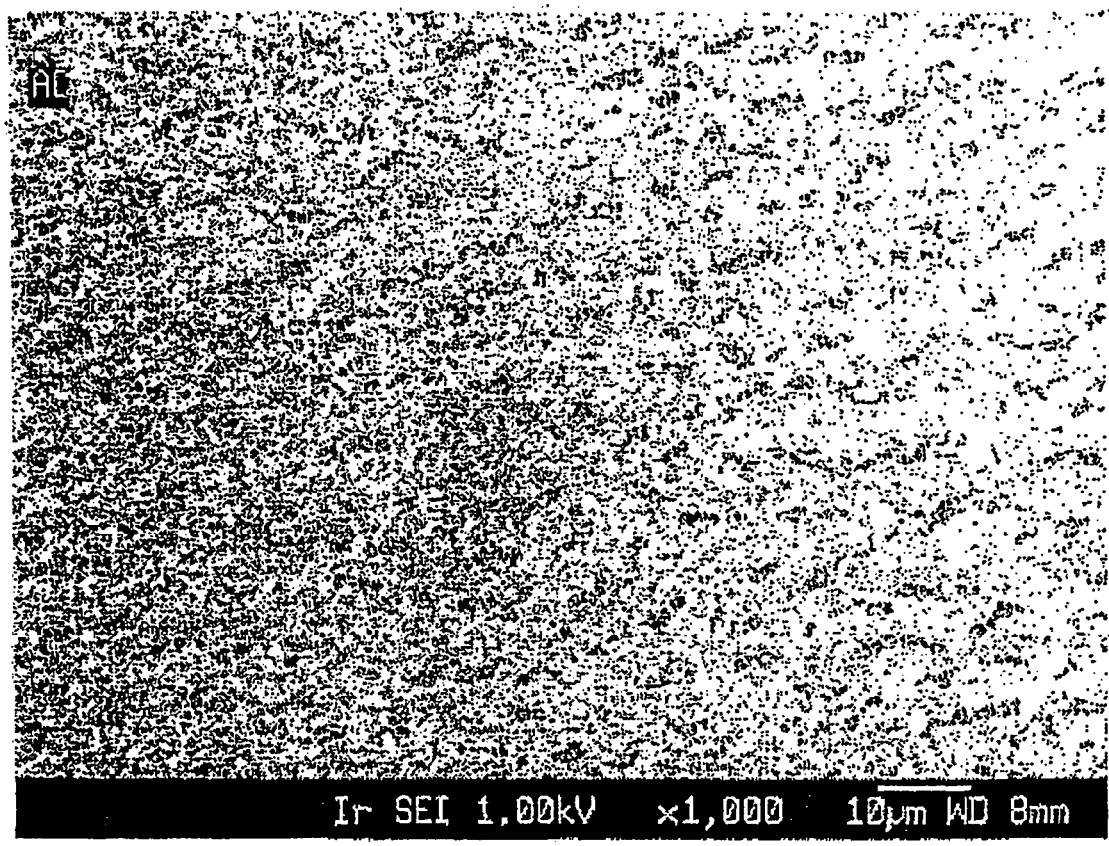
FIG. 1 is a scanning electron microscope (SEM) photograph showing a surface of a composite membrane of Example 1 according to the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention is described in detail as follows.

The present invention provides a composite membrane and a preparation method for the same that involves coating a common film having no pores with an active material, instead of as in the conventional method of coating a microporous film with an active material.

The composite membrane of the present invention is prepared by joint-use of a conventional dry process in which the pores are formed by stretching, and a phase inversion that is used with a solution. In addition, when an ion beam irradiation step is added in the preparation steps to prepare the membrane of the present invention, an interface bond between a support layer and an active layer is improved.

The preparation method using a conventional dry process is a method in which pores are formed by rupturing a relatively weak amorphous region through cold stretching after orientating a polymer crystalline region in a certain direction, and the orientation uniformity of the crystalline region is critical for characteristics of the membrane.

The method using phase inversion is a method in which pores are formed by phase-separation of a polymer and a solvent from the solution under a controlled temperature, or the use of a non-solvent after preparing a polymer solution.

In order to modify the surface, an ion beam irradiation process is used in which gases such as gaseous argon, hydrogen, oxygen, nitrogen, and carbon dioxide are ionized and irradiated to the surface under an atmosphere of reactive gases to be reacted with the ions and the surface when the ionized gases collide with the surface of the membrane.

In the present invention, in order to prepare a material used as a support layer, a precursor film is prepared in one step of the drying process, it is coated with a polymer solution used for an active layer, it is phase-separated from the polymer solution under suitable conditions, and it is stretched, and thereby the membrane is prepared and pores are formed on the membrane. During the membrane preparation, in order to increase an interfacial adhesion strength between the support layer and the active layer, the ion beam irradiation process is performed before the coating process, so that the membrane surface is modified. The composite membrane of the present invention comprises materials having pores, which are used for the support layer and the active layer, respectively. The pore size and distribution of the support layer and active layer are different from each other, with the pores of the support layer being formed by a stretching process after orientating a polymer crystalline region in a certain direction during the precursor film preparation. The pores of the active layer, on the other hand, are formed by a stretching process after forming a densely structured polymer film through phase-inversion. Micro-cracks and micro-pores of the polymer film can be formed according to the phase-inversion conditions before the film is stretched, so the degree of pore formation is controllable according to said phase-inversion conditions.

The support layer of the present invention has the same characteristics as a membrane prepared from the conventional dry process, and the active layer has pores with various sizes according to the process conditions. In addition, inter-diffusion among the polymer chains of the support layer and active layer improves through high temperature-stretching and heat-setting, and the surface bond between the support layer and the active layer strengthens. when ion beams are irradiated to the layers, the surface bond may further strengthen.

The material used for the support layer of the present invention is not limited to a certain material, and it generally includes one or more materials selected from the group consisting of high density polyethylene, low density polyethylene, linear low density polyethylene, polypropylene, high crystalline polypropylene, polyethylene-propylene copolymer, polyethylene-butylene copolymer, polyethylene-hexene copolymer, polyethylene-octene copolymer, polystyrene-ethylene-butylene-styrene copolymer, polystyrene, polyphenylene oxide, polysulfone, polycarbonate, polyester, polyamide, polyurethane, polyacrylate, polyvinylidene chloride, polyvinylidene fluoride, polysiloxane, polyolefin, ionomer, polymethylpentene, and hydrogenated oligocyclopentadiene (HOCP), and a mixture thereof, and preferably only material, blended material, or laminated material selected from the aforementioned group is used.

The polymer of the polymer solution used for the active layer is selected according to the eventual use of the composite membrane, and it preferably includes at least one material selected from the group consisting of polyethylene, polypropylene, polyvinylidene fluoride, polyvinylidene fluoride-hexafluoropropylene copolymer, polyethylene oxide, polypropylene oxide, polybutylene oxide, polyurethane, polyacrylonitrile, polyacrylate, polyacrylic acid, polyamide, polyacrylamide, polyvinylacetate, polyvinylpyrrolidone, polytetraethylene glycol diacrylate, polysulfone, polyphenylene, oxide, polycarbonate, polyester, polyvinylidene chloride, polysiloxane, and a polyolefin inomer, and a derivative thereof.

The solvent of the polymer solution is selected according to the polymer used, and it preferably includes at least one solvent selected from 1-methyl-2-pyrrolidone (NMP), acetone, ethanol, n-propanol, n-butanol, n-hexane, cyclohexanol, acetic acid, ethyl acetate, diethyl ether, dimethyl formamide (DMF), dimethylacetamide (DMAc), dioxane, tetrahydrofuran (THF), dimethyl sulfoxide (DMSO), cyclohexane, benzene, toluene, xylene, and water, and a mixture thereof.

The polymer solution is preferably used under the following conditions. During the coating process of the polymer solution, a common film having no pores is dip-coated in the polymer solution, with the concentration of the polymer solution preferably being 0.01 wt % or greater. In addition, it is preferable that the drying of the, coated polymer is performed at a relative humidity ranging from 1 to 100% under an atmosphere of a gas selected from gases comprising nitrogen, oxygen, carbon dioxide, and air at a saturated vapor pressure of less than a saturated vapor pressure of the solvent. The thickness of the active layer after coating and drying preferably ranges from 0.1 to 20 μm.

The ion beam irradiation is performed under a vacuum ranging from $10^{-1}$ to $10^{-6}$ torr, with activated, electrons, hydrogen, helium, oxygen, nitrogen, carbon dioxide, air, fluorine, neon, argon, krypton, and $N_2O$, and a mixture thereof, the aforementioned ion particles having an energy ranging from 0.01 to $10^6$ keV. Preferably, the amount of the ion particle ranges from $10^5$ to $10^{20}$ ions/cm$^2$. The reactive gases preferably include helium, hydrogen, oxygen, nitrogen, ammonia, carbon monoxide, carbon dioxide, chlorofluorocarbon, methane, and $N_2O$, and a mixture thereof, and the flow rate of the reactive gases preferably ranges from 0.5 to 20 ml/minute.

The preparation method of the composite membrane according to the present invention comprises the following steps.

a) Precursor film preparation of the support layer: A precursor film is prepared by extrusion of a polymer used for a support layer with an extruder equipped with a T-die or tubular die.

b) Annealing: The precursor film is annealed in a dry oven at a temperature lower than a melting point of the polymer so that the precursor film has an increased crystallinity and ratio of elastic recovery.

c) Irradiation of ion beams with the help of an reactive gas: After the precursor film is placed in a vacuum chamber and ionized gas is injected into an ion gun so that the gas has an energy, the ion particles having an energy are irradiated on either or both sides of the precursor film, depending on various currents. A power source is controlled in order that the energy of the ions ranges from 0.01 to $10^6$ keV. while irradiating the ion beams, an reactive gas of which flow rate is varied from 0.5 to 20 ml/minute is injected into the vacuum chamber in order to modify a surface of the precursor film. The modification of the surface of the precursor film may be performed before or after annealing, depending on desired physical properties of the multi-component composite membrane.

d) Coating the precursor film with a polymer solution used for an active layer: After a polymer solution is prepared by dissolving a polymer used for an active layer in a desired solvent, the precursor film is coated with the polymer solution. The precursor film may be used before or after annealing. In addition, before coating, the irradiation of ion beams with the help of the reactive gas may be performed, depending on the physical properties of the multi-component composite membrane. Concentration and coating conditions may be varied according to materials used and the eventual use of the composite membrane.

e) Formation of a polymer film by phase-inversion: After coating, the solvent is vaporized under suitable conditions. The structure of the polymer film of the active layer depends on the drying conditions.

f) Low-temperature stretching: Microcracks are formed by mono-axially stretching the annealed film with use of a roll or other different stretching machines at a temperature lower than room temperature.

g) High-temperature stretching: Micropores having desirable sizes are formed and mechanical properties are provided to a membrane by the ion-beam-irradiation and mono-axially or bi-axially stretching the low temperature stretched film with use of a roll or other machine at a temperature lower than a melting point of the polymer of the support and active layers.

h) Heat-setting: After the high-temperature stretching, the film is heat-set at a temperature lower than a melting point of the polymer of the support and active layers under tension, for a certain time.

The preparation steps of the multi-component composite membrane describe the overall processes for preparing a membrane having optimum physical properties, wherein the membrane can be prepared not only by skipping some of the steps or adding processes depending on physical properties, but also by changing the sequence of each of the steps.

The following Examples and Comparative Examples illustrate the present invention in further detail, but the present invention is not limited by these examples.

The microporous membranes prepared by the following Examples and Comparative Examples were evaluated according to the following characteristics:

a) thickness;
b) air permeability: JIS P8117;
c) pore size: scanning electron microscope (SEM), transmission electron microscope (TEM);
d) interfacial adhesion strength: JIS Z0237; and
e) a wet-out rate of electrolyte (electrolyte used: ethylene carbonate (EC):dimethyl carbonate (DC)=4:6)

EXAMPLE 1

Composite Membrane Prepared from High Crystalline Polypropylene and Kynar461

A high crystalline polypropylene was used for a support layer and a polyvinylidene fluoride (PVDF) was used for an active layer in order to prepare a precursor film, and the precursor film was stretched through a dry process in order to prepare a composite membrane.

(Preparation of a Precursor Film)

High crystalline polypropylene was used for a component of a support layer. It has a melting index of 0.50 g/min, a density of 0.91 g/cc, a melting point of 166.5° C. measured with a dynamic scanning calorimeter (DSC), a crystallization temperature of 134.5° C., a crystallinity of 57%, isotacticity of 98% measured by $C^{13}$ nuclear magnetic resonance (NMR), and an atactic fraction of about 2% measured after dissolution in xylene, and a precursor film was prepared from the high crystalline polypropylene with use of a single screw extruder equipped with T-die and a take-up device. Extrusion temperature and cooling-roll temperature was 220° C. and 80° C. respectively, take-up speed was 20 m/min, and a draw down rate (DDR) was 60.

(Annealing)

The prepared precursor film was annealed in a dry oven at 150° C. for 1 hour.

(Coating)

After annealing, a solution prepared by dissolving Kynar461 (a product by Elf Atochem North America Co.) having low crystallinity in acetone was dip-coated on both sides of the prepared precursor film. The coating was performed under air while maintaining 60% relative humidity, and the acetone was vaporized at the same condition of 60% relative humidity. Thickness of the coated Kynar461 was about 3 μm.

(Low-Temperature Stretching)

After coating, the coated film was mono-axially low-temperature stretched to 50% of the stretching ratio based on the initial length of the film at room temperature.

(High-Temperature Stretching)

After low-temperature stretching, the low-temperature-stretched film was mono-axially high-temperature stretched to 100% of the stretching ratio based on the initial length of the film, at 140° C.

(Heat-Setting)

After the high-temperature stretched film was heat-set at 140° C. under tension for 10 minutes, a composite membrane was prepared by cooling the heat-set film.

Properties of the composite membrane are represented in Table 1.

It is shown in Table 1 that micropores form on an active layer as well as a support layer according to Example 1, and air permeability of the membrane according to Example 1 improves, compared to no micropores forming on the Kynar461: used for an active layer (See FIG. 1 and FIG. 2) when the Kynar461 was coated on a separator as in the conventional preparation method. In addition, the interfacial adhesion strength between the support layer and the active layer increased. It is supposed that the wet-out rate of electrolyte increased due to the change of morphology and the increase of adhesion strength.

EXAMPLE 2

A Composite Membrane Prepared from High Crystallinity Polypropylene and Kynar461 with Irradiation of Ion Beams A composite membrane was prepared by same method of Example 1, except that ion beams were irradiated on a precursor film before coating with the Kynar461 solution. After the precursor film prepared in the same manner as in Example 1 was placed in a vacuum chamber while keeping the pressure, ranging from $10^{-5}$ to $10^{-6}$ torr, argon cations were irradiated to both sides of the precursor film with an ion gun, and simultaneously oxygen used as an reactive gas was injected into the chamber in an amount of 4 ml/min in order to treat the precursor film surface. Energy of the ion beams was 0.5 keV, and the irradiation amount of ions was $10^{16}$ ions/cm$^2$. After the ion-beam irradiation, a composite membrane was prepared in the same manner as in Example 1.

In Table 1, it is shown that pores were formed on both the support layer and the active layer as in Example 1, and in particular, the interfacial adhesion strength between the support layer and the active layer, and the wet-out rate of the electrolyte were appreciably improved.

EXAMPLE 3

A Membrane Prepared from High Density Polyethylene/Kynar461

A composite membrane was prepared in the same manner as in Example 1, except that high density polyethylene was used for a support layer instead of high crystalline polypropylene. The high density polyethylene had a melt index of 0.3 g/10 min and a density of 0.964 g/cc. A precursor film was prepared in the same manner as in Example 1. The extrusion temperature and cooling-roll temperature of the take-up device were respectively 200° C. and 80° C., the take-up speed of the film was 30 m/min, and the draw-down ratio of the prepared precursor film was 80. The prepared precursor film was annealed in a dry oven at 125° C. for 1 hour. Both sides of the annealed precursor film were coated with Kynar461 in the same manner as in Example 1. The coated precursor film was mono-axially stretched at room temperature to 50% of the stretching ratio based on the initial length of the film, and then it was, immediately mono-axially high-temperature stretched to 50% of the stretching ratio based on the initial length of the film, at 120° C. The high-temperature stretched film was heat-set at 120° C. under tension for 10 minutes, and then a composite membrane was prepared by cooling the heat-set film. Table 1 shows properties of the prepared composite membrane.

In Table 1, it is observed that pores formed on both the support layer and the active layer as in Example 1, and the interfacial adhesion strength and wet-out rate of the electrolyte improved.

Comparative Example 1

A Composite Membrane Prepared from Celgard2400 and Kynar461

An active layer was coated on a microporous membrane by the conventional method.

Celgard2400 (a product by Celanese Co.) prepared from only polypropylene was used for the porous membrane as a support layer, Kynar461 was used for an active layer as in Examples 1, 2 and 3, and the Kynar461 solution was coated on the Celgard2400 having pores, and thereby a composite membrane was prepared.

Figure 2:
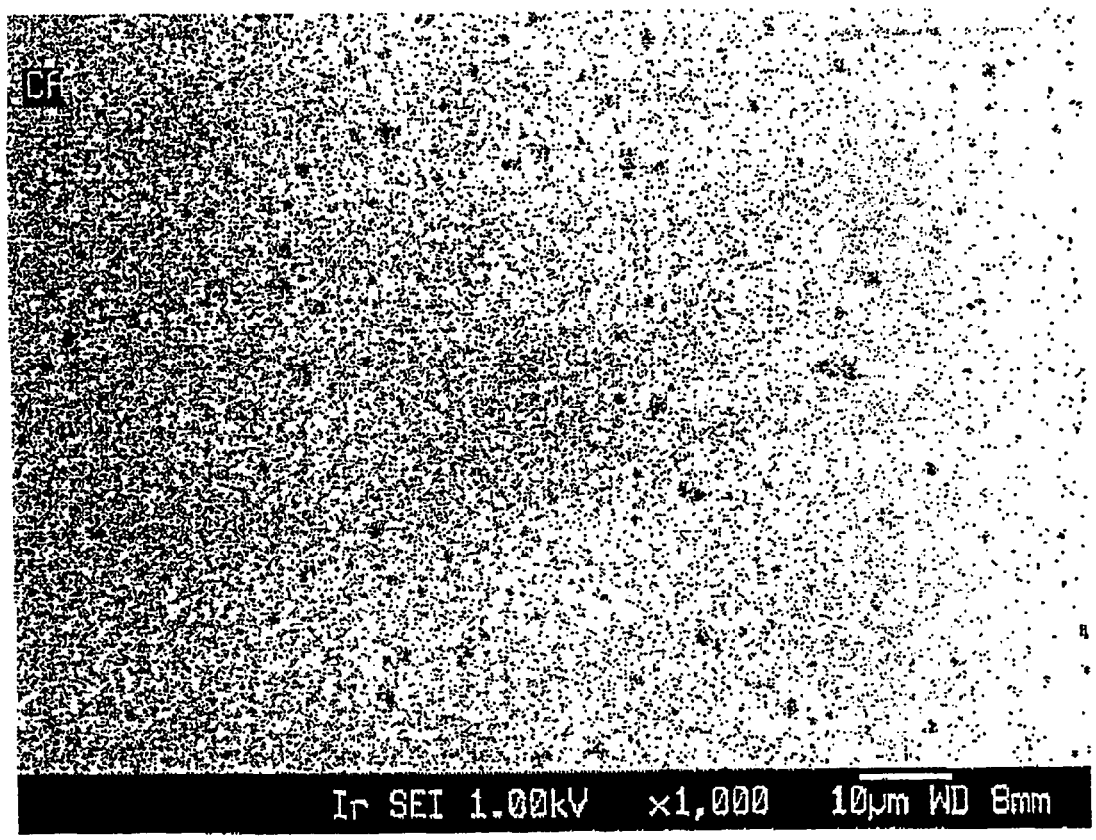
FIG. 2 is a SEM photograph showing a surface of a conventional composite membrane according to Comparative Example 1.

FIGS. 1 and 2 show that the composite membrane of Comparative Example 1 has no pores, unlike the composite membrane of the examples according to the present invention that have pores formed on the active layer.

Table 1 shows properties of the prepared composite membranes. It is shown that the composite membrane prepared from Celgard2400 and Kynar461 had an air: permeability too inferior to measure, and the interfacial adhesion strength and wet-out rate of electrolyte were inferior.

TABLE 1

|  |  | Example 1 | Example 2 | Example 3 | Comparative Example 1 |
|---|---|---|---|---|---|
| Thickness (μm) | | 20 | 20 | 20 | 20 |
| Pore size (μm) | Support layer | 0.3 × 0.1 | 0.3 × 0.1 | 0.4 × 0.1 | 0.3 × 0.1 |
| | Active Layer | 0.8 × 0.3 | 0.8 × 0.3 | 0.6 × 0.3 | Unable to be measured |
| Air permeability (sec/100 cc) | | 560 | 565 | 620 | Unable to be measured |
| Interfacial adhesion strength ($g_f$) | | 180 | 250 | 240 | 85 |
| Wet-out rate of an electrolyte (sec) | | 10 | 8 | 9 | 45 |

The composite membrane prepared by the conventional method has a permeability that is too inferior to be measured, but the composite membranes of the present invention have an improved air permeability ranging from 560 to 620 sec/100 cc, because both the active layer and the support layer have a dense structure with pores of a controllable size prepared under suitable preparation conditions. In addition, the active layer located on the exterior side of the composite membrane has good properties. That is, the support layer of the present invention has the same properties as the membrane prepared by the conventional dry process, and the active layer has pores with various sizes according to the process condition.

In addition, while the composite membrane prepared by the conventional method has an interfacial adhesion strength of 85 $g_f$, the composite membrane of the present invention has an improved interfacial adhesion strength ranging from 180 to 250 $g_f$. The improved interfacial adhesion strength results from high-temperature stretching and heat-setting, that is, the interfacial adhesion strength increases because the mutual bond between polymer chains of the support and active layers strengthens. The interfacial adhesion strength improves further by irradiation of ion beams.

Furthermore, the wet-out rate improves appreciably, and it is supposed that the improvement of the wet-out rate is due to changes of morphology and an increase of the interfacial adhesion strength.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A preparation method of a multi-component composite membrane comprising steps of:
    a) preparing a precursor film by injection of a polymer, which is used, for a support layer into an extruder;
    b) annealing the precursor film at a temperature less than a melting point of the polymer;
    c) coating both surfaces of the precursor film with a polymer solution, which is used for an active layer;
    d) drying the coated precursor film;
    e) low temperature-stretching the dried precursor film at a temperature less than room temperature;
    f) high temperature-stretching the low temperature-stretched precursor film at a temperature less than the melting point of the polymer; and
    g) heat-setting the high temperature-stretched precursor film under tension at a temperature less than the melting point of the polymer.

2. The preparation method according to claim 1, wherein the polymer solution of step c) is coated on both sides of the precursor film by dip-coating.

3. The preparation method according to claim 1, wherein a concentration of the polymer solution of step c) is equal to or greater than 0.01 wt %.

4. The preparation method according to claim 1, wherein the drying of step d) is performed at a relative humidity ranging from 1 to 100%.

5. The preparation method according to claim 1, wherein the drying of step d) is performed under saturated vapor pressure.

6. The preparation method according to claim 1, wherein the drying of step d) is performed under a gas atmosphere selected from the group consisting of nitrogen, oxygen, carbon dioxide, and air atmosphere.

7. The preparation method according to claim 1, wherein an active layer having a thickness in the range of 0.1 to 20 µm is formed through the coating and drying of steps c) and d).

8. The preparation method according to claim 1, which further comprises the step of applying ion beams to either or both surfaces of the annealed precursor film with reactive gas between the steps b) and c).

9. The preparation method according to claim 8, wherein the ion beam irradiation is performed by activation of electrons and a gas selected from the group consisting of hydrogen, helium, oxygen, nitrogen, carbon dioxide, air, fluorine, neon, argon, krypton, $N_2O$, and a mixture thereof such that the gas has an energy ranging from 0.01 to $10^6$ keV; and irradiating the surface of the precursor film with the ion beams.

10. The preparation method according to claim 8, wherein the ion beam irradiation amount ranges from $10^5$ to $10^{20}$ ions/cm$^2$.

11. The preparation method according to claim 8, wherein the ion beam irradiation is performed under a gas atmosphere selected from the group consisting of helium, hydrogen, nitrogen, ammonia, carbon monoxide, carbon dioxide, chlorofluoro methane, methane, and $N_2O$ atmospheres, and mixtures thereof.

12. The preparation method according to claim 11, wherein the flow rate of the reactive gas ranges from 0.5 to 20 ml/minute.

13. The preparation method according to claim 8, wherein the ion beam irradiation is performed under a vacuum ranging from $10_{-1}$ to $10^{-6}$ torr.

14. A preparation method of a multi-component composite membrane comprising steps of:
    a) annealing a precursor film comprising a polymer at a temperature less than a melting point of the polymer;
    b) coating both surfaces of the precursor film with a polymer solution, which is used for an active layer;
    c) drying the coated precursor film;
    d) low temperature-stretching the dried precursor film at a temperature less than room temperature;
    e) high temperature-stretching the low temperature-stretched precursor film at a temperature less than the melting point of the polymer; and
    f) heat-setting the high temperature-stretched precursor film under tension at a temperature less than the melting point of the polymer.

15. The preparation method according to claim 14, wherein the polymer solution of step b) is coated on both sides of the precursor film by dip-coating.

16. The preparation method according to claim 14, which further comprises the step of applying ion beams to either or both surfaces of the annealed precursor film with reactive gas between the steps a) and b).

17. The preparation method according to claim 16, wherein the ion beam irradiation is performed by activation of electrons and a gas selected from the group consisting of hydrogen, helium, oxygen, nitrogen, carbon dioxide, air, fluorine, neon, argon, krypton, $N_2O$, and a mixture thereof such that the gas has an energy ranging from 0.01 to $10^6$ keV; and the surface of the precursor film with the ion beams.

* * * * *